Oct. 7, 1969  P. R. HASKELL ET AL  3,470,860
TARGET THROWING TRAP

Filed June 10, 1966  5 Sheets-Sheet 1

INVENTORS:
PHILIP R. HASKELL
ROGER C. KANE

ATTORNEYS

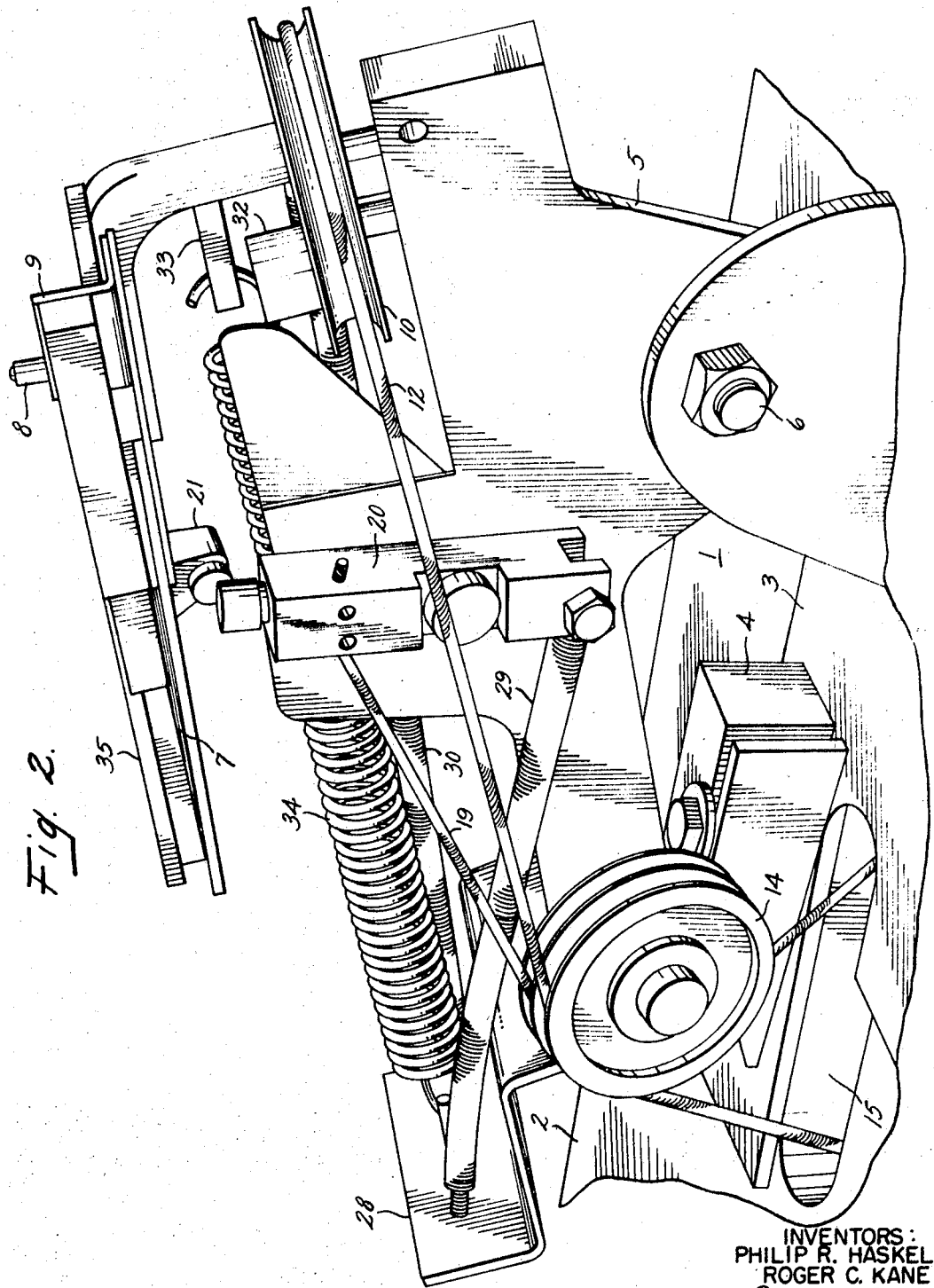

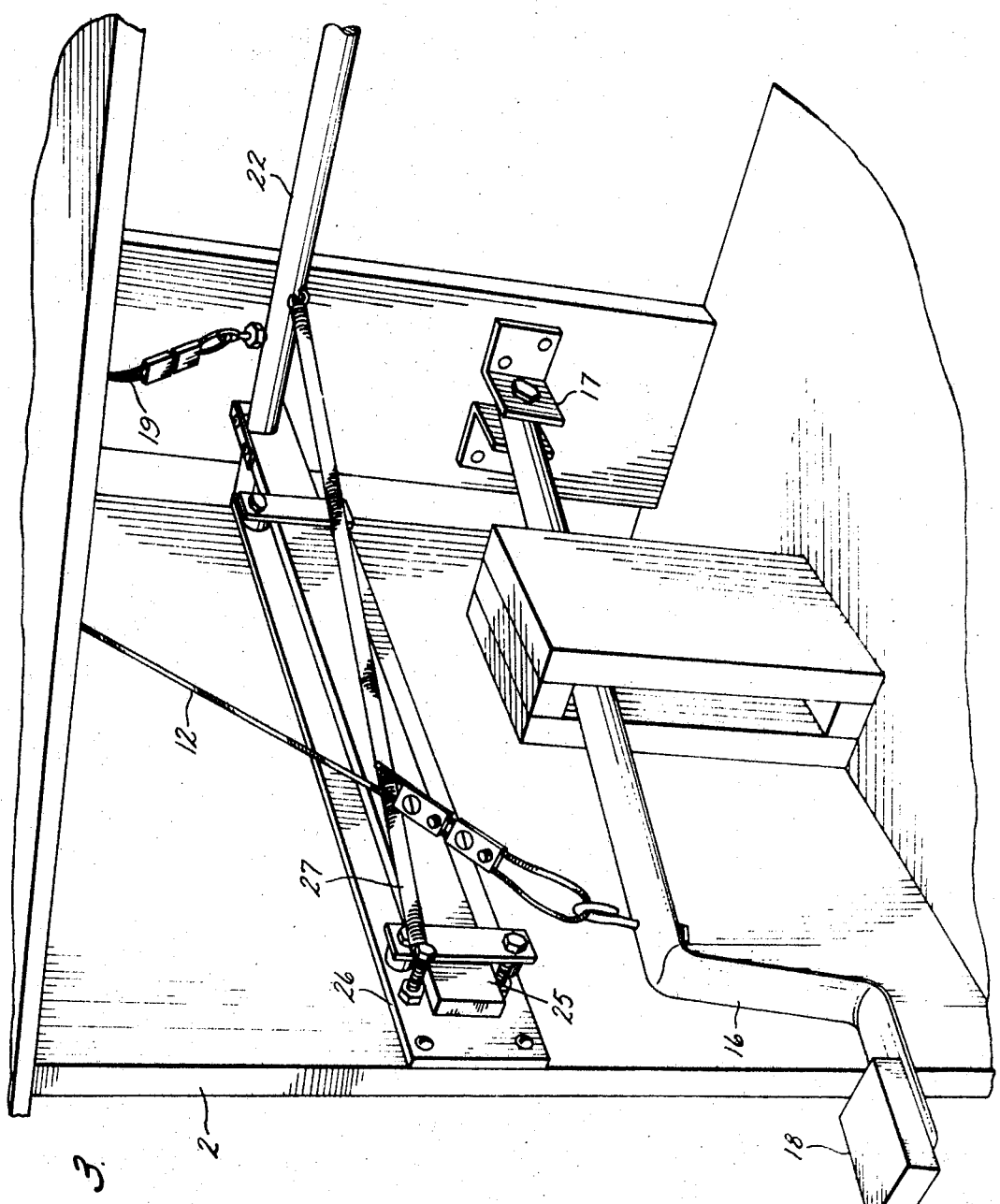

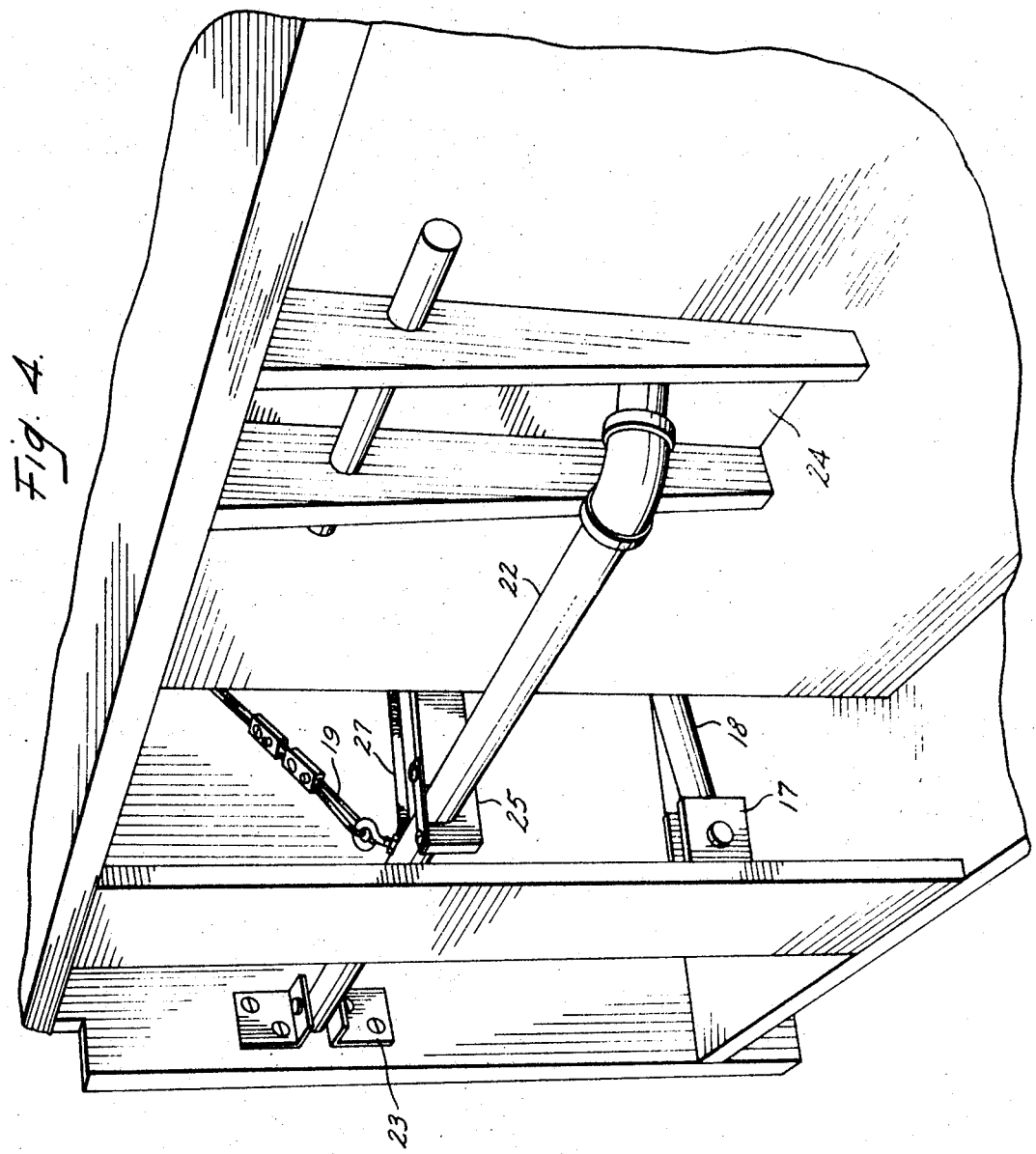

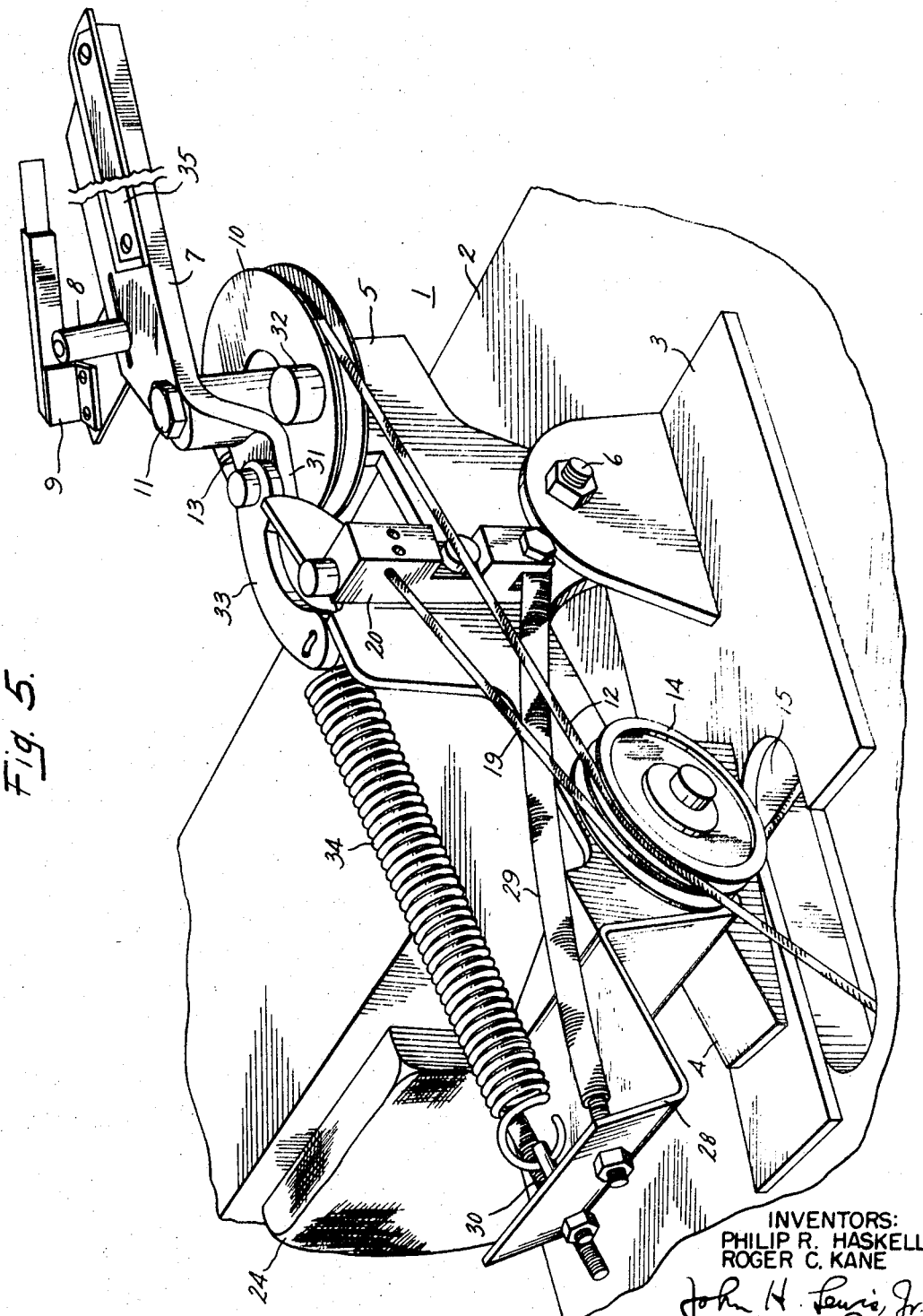

| United States Patent Office | 3,470,860 |
|---|---|
| | Patented Oct. 7, 1969 |

3,470,860
TARGET THROWING TRAP
Philip R. Haskell, Easton, and Roger C. Kane, Ridgefield, Conn., assignors to Remington Arms Company, Inc., Bridgeport, Conn., a corporation of Delaware
Filed June 10, 1966, Ser. No. 556,706
Int. Cl. F41b *3/04;* F41f *13/02*
U.S. Cl. 124—8                          2 Claims

ABSTRACT OF THE DISCLOSURE

A target throwing trap or shooting station for a new shooting game in which the shooter stands adjacent the tray and cocks, loads, and releases the trap himself. To facilitate operation by the shooter with the gun in his hands the trap is cocked by the shooter stepping on a foot pedal and released by the forward movement of the shooter's knee into engagement with a release member as the shooter assumes a conventional crouched shooting position.

---

This invention relates to target throwing traps, and in particular, to a trap for throwing clay targets or pigeons and which can be loaded, cocked and released by the shooter.

At the present time, clay target shooting takes place at large gun clubs, small indoor ranges or in fields. At the gun clubs shooting is done by squads who participate in either trap or skeet. This is quite formal and usually attracts the seasoned shooters. Very few new shooters frequent gun clubs and the few that do are usually brought to the club by a friend who normally shoots there. Such shooting requires operators and expensive equipment which also deters new shooters because of the cost to shoot.

Recently an automatic trap has been developed for indoor trap shooting. This was developed in the hopes of attracting new shooters to the sport of clay target shooting. The targets used are miniature clay pigeons and are shot at with 22 caliber rifles using 22 caliber shot cartridges. It is quite difficult for even an experienced shooter to break any number of miniature targets with such a cartridge, and consequently, a new shooter quickly becomes discouraged and loses interest in shooting clay targets. Furthermore, the trap for such installations is coin operated and automatic. Once the money is put in and the machine started it will throw the targets with a predetermined time interval between each but giving the shooter no control over the throwing of the targets.

Target shooting in fields or other informal clay target shooting is usually only done by experienced shooters. This is due to the fact that these people have the equipment necessary, whereas, new shooters would not only be without guns and traps but would not know how to proceed with this type of shooting.

In order to interest and introduce neophyte shooters to the sport of clay target shooting the trap which is the subject of this application was developed along with a new type of shooting station and game. In the past, shooters have only taken the proper position and shot at the targets while others loaded the traps and released them or this was done by an automatic machine. The subject trap was designed to allow the shooter to cock, load and release it as he was ready to shoot.

Because areas to shoot are rapidly decreasing, a new game was devised that can be used in a small space. This game consists of shooting at miniature clay targets which are thrown from the trap which is the subject of this application. The trap is mounted in a house which is also the shooting station and as previously mentioned the shooter operates the trap as well as doing the shooting. The ammunition used is 32 caliber rimfire shot cartridges loaded so that the muzzle velocity is below the speed of sound. Such a cartridge has limited range and the noise level is very low. Such a combination allows the game to be used at golf driving ranges and similar outdoor recreation areas without disturbing the neighbors with the noise and without the targets or shot pellets reaching outside the area already used for driving golf balls or other recreational activities.

The purpose of this invention is to provide a trap which can be cocked, loaded and released by a shooter standing at the shooting station.

A further purpose of this invention is to provide a trap for a new shooting game which can be used in a limited amount of space.

It is contemplated that these objectives may best be achieved by providing a trap having a throwing arm mounted on a base that is adjustable both vertically and horizontally and having remote cocking and releasing members. The trap is intended to be mounted in a shooting station on top of a shooting bench with the cocking member extending from the bottom of the bench into the station directly beneath the trap. The releasing member is mounted on a section of bench adjacent to the trap but beneath the top of the bench. With an arrangement such as has been described, the shooter taking his position within the shooting station can operate the cocking member with his foot and the releasing member with his knee.

It is to be understood that the embodiments of this invention to be disclosed below are equally applicable to all types of target throwing traps.

Other objects and advantages of this invention will become apparent as the following description proceeds and the features of novelty which characterize this invention will be pointed out with particularity in the claims annexed to and forming part of this specification.

In the drawings:

FIGURE 2 is a side elevation view showing a target trap in the cocked position embodying the present invention;

FIGURE 3 is a perspective view of an open shooting bench partially in section showing the cocking and releasing mechanism which forms a part of the present invention;

FIGURE 4 is a perspective view of the front of the open shooting bench partially in section showing the release mechanism which forms a part of the present invention; and FIGURE 5 is a perspective view showing a target trap in the released position embodying the present invention.

Figure 1:
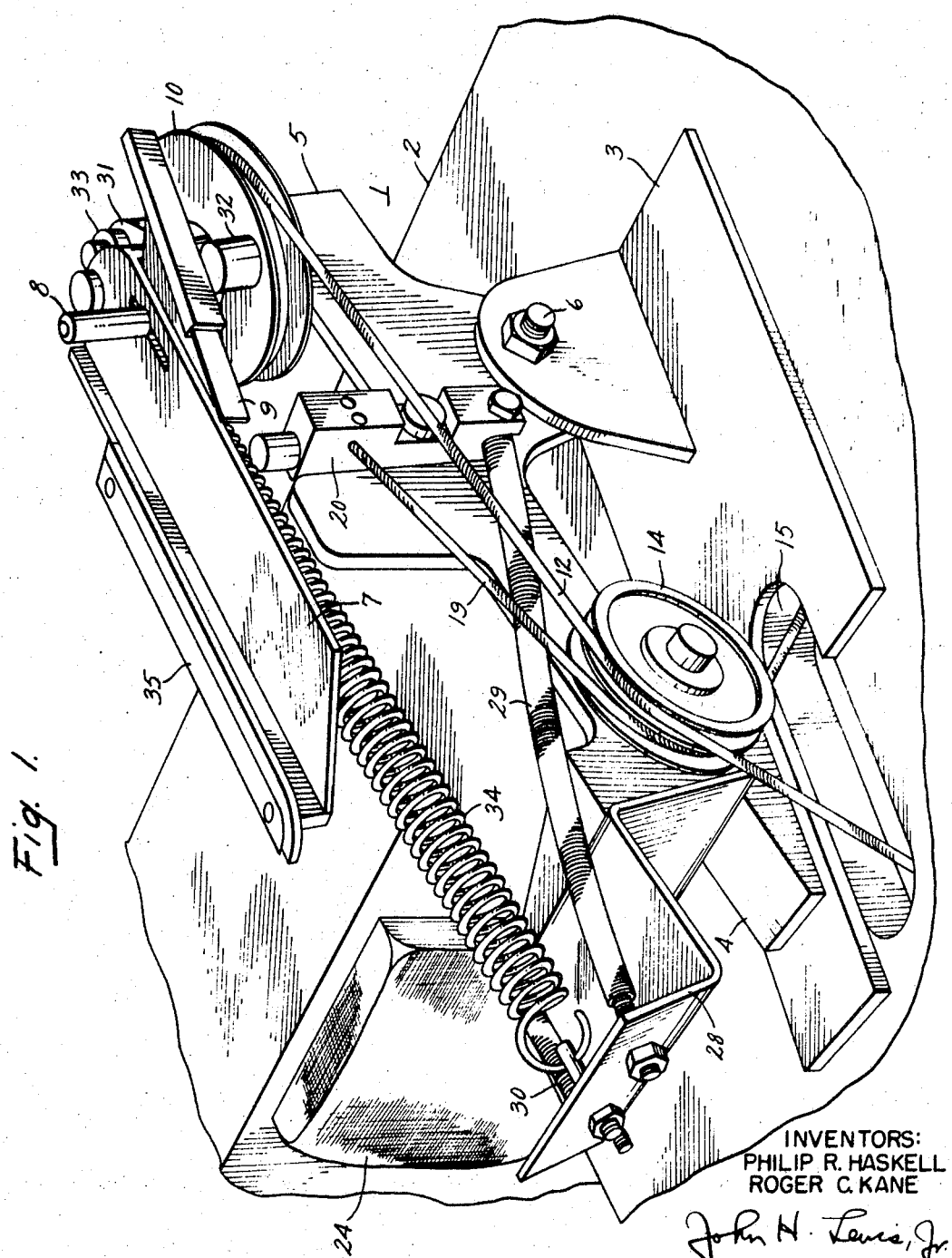
FIGURE 1 is a perspective view showing a target trap in the cocked position embodying the present invention and mounted on a shooting bench.

Referring to the drawings, it can be seen that the trap 1 is designed to be mounted on top of a shooting bench 2. Trap 1 has a base 3 including an adjusting block 4. An elevating bracket 5 is pivotally connected at one end to base 3 by a bolt 6 and has its other end resting on block 4. A target throwing arm 7 is rotatably mounted on bracket 5 adjacent bolt 6. Both a target stop 8 and a target retainer 9 are carried by arm 7.

In order to cock trap 1, a cocking pulley 10 is rotatably mounted on the same axis as arm 7. Both arm 7 and pulley 10 are retained on trap 1 by a bolt 11 shown in FIG. 5. A cocking cable 12 is attached to pulley 10 at point 13 and passes over one side of a double pulley 14 and through an opening 15 in bench 2. The end of cable 12 that passes through opening 15 is attached to a cocking arm 16 hingedly mounted in bench 2 to a bracket 17. Arm 16 carries a pedal 18 at the end opposite bracket 17.

Also passing over pulley 14 is a release cable 19 having its upper end attached to a trigger 20 which in turn is pivotally attached to bracket 5 so as to engage a sear 21 attached to the underside of arm 7. The lower end of cable 19 is attached to a pipe 22 hingedly supported at one end by bracket 23 and attached at its other end to releasing member 24. Member 24 is supported at approximately its mid-point by a sliding arm 25 which slides in assembly 26 attached to bench 2 and is kept in the forward or cocked position by biasing spring 27.

Attached to the end of elevating bracket 5 which rests on block 4 is a spring supporting bracket 28. Spring 29 attached to bracket 28 is also attached to trigger 20 and biases trigger 20 to the cocked position. Another spring 30 is attached between bracket 28 and pulley 10 to maintain pulley 10 in the ready to cock position. Spring 30 by acting on pulley 10 retains cocking arm 16 in the upward or ready to cock position.

Throwing arm 7 is formed with a down turned flange 31 which is positioned to be engaged by a stud 32 attached to cocking pulley 10. Rotation of cocking pulley 10 causes rotation of arm 7 from the uncocked position shown in FIG. 5 to the cocked position shown in FIGS. 1 and 2. Pivotally attached to arm 7 is an extension 33 to which is attached one end of the throwing spring 34. The other end of spring 34 is attached to bracket 28.

In order to use the trap, an operator or shooter begins by stepping on pedal 18 depressing it to its limit. This action pulls cable 12 downward which in turn causes pulley 10 to rotate clockwise. As pulley 10 rotates stud 32 engages flange 31 and rotates arm 7 clockwise. The rotation of arm 7 pulls extension 33 forward and in a clockwise direction placing spring 34 in tension.

Near the end of the movement of arm 7, sear 21 engages trigger 20 causing trigger 20 to move slightly to the rear allowing arm 7 and sear 21 to move past trigger 20. At this point pedal 18 has been depressed to its maximum extent and spring 29 moves trigger 20 to its normal or cocked position. The shooter now releases pressure on pedal 18 which is returned to its normal or upright position as a result of spring 30 returning pulley 10 to its normal position. This action pulls cable 12 back to its normal position and it in turn acts on arm 16 raising pedal 18.

Once the pressure on pedal 18 is released spring 34 tends to pull throwing arm 7 back to its uncocked position. Such movement is prevented by trigger 20 engaging sear 21 and maintaining throwing arm 7 in the cocked position. At this time the shooter now places a clay target (not shown) on throwing arm 7 so that it engages target stop 8, target retainer 9 and rail 35 which is attached to throwing arm 7.

The trap 1 is now conditioned to throw a clay target at which the shooter can shoot. Prior to releasing trap 1 the shooter takes his position to the left of trap 1 and prepares to fire. Once he is ready to shoot, all that is required is for the shooter to press his knee against releasing member 24 pushing it forward. This movement pushes pipe 22 forward against the action of spring 27 and in turn pulls cable 19 down and forward.

Movement of cable 19 pulls trigger 20 rearward disengaging trigger 20 from sear 21. The tension in spring 34 now pulls extension 33 rearward causing throwing arm 7 to rapidly swing in a counter-clockwise direction. This rapid swing of arm 7 causes the target to accelerate and slide along arm 7 against rail 35 until it reaches the end, at which time it leaves trap 1 and sails away from the shooter presenting him with a flying target. This sequence can be repeated as soon as the shooter is ready once again.

While only the trap and a portion of the shooting bench has been shown, it is contemplated that the trap which constitutes the present invention will be used in a shooting station of which the bench is only a portion. The trap, as has been stated, may be used in locations of limited space and the shooting station may take any form so long as a suitable bench is provided for it to be mounted on along with the required cocking and releasing members.

What is claimed is:

1. A target throwing trap comprising a base, a bracket mounted on said base, a target throwing arm movably mounted on said bracket, a rotatable cocking member mounted on said bracket between said bracket and said arm, a sear mounted on the underside of said arm, a trigger movably mounted on said bracket and spring biased to engage said sear when said arm is in the cocked position, a throwing spring connected between said arm and said bracket, first means positioned remote from said cocking member and comprising a foot pedal depressable by stepping thereon and operatively connected to said cocking member to cock said arm and tension said throwing spring, second means comprising a releasing member mounted remote from said trigger, knee-high and immediately in front of a shooter's position and means operatively connected between said releasing member and said trigger to move the trigger against the bias of the trigger spring to release said arm in response to enegagement by the shooter's knee whereby a target positioned on said arm will be thrown from said trap.

2. The invention set forth in claim 1, wherein said trap is mounted on top of a shooting bench adjacent the shooter's position and said first and second means are mounted in said bench beneath said top.

References Cited

UNITED STATES PATENTS

| 1,093,524 | 4/1914 | Best | 124—8 |
| 1,206,416 | 11/1916 | Cosby | 124—8 |
| 2,193,266 | 3/1940 | Betts | 124—8 |
| 2,996,058 | 8/1961 | Ervine | 124—8 |
| 3,254,639 | 6/1966 | Laird | 124—36 XR |

RICHARD C. PINKHAM, Primary Examiner

WILLIAM R. BROWNE, Assistant Examiner

U.S. Cl. X.R.

124—34, 36